United States Patent [19]
Tachiuchi et al.

[11] Patent Number: 4,839,739
[45] Date of Patent: Jun. 13, 1989

[54] IMAGE SIGNAL BINARY CIRCUIT WITH A VARIABLE-FREQUENCY CLOCK SIGNAL GENERATOR FOR DRIVING AN IMAGE SENSOR

[75] Inventors: Tsuguji Tachiuchi, Odawara; Satoshi Konuma, Kamakura; Nobuo Tsuchiya, Yokohama, all of Japan

[73] Assignees: Hitachi, Ltd.; Hitachi Video Engineering, Inc., both of Tokyo, Japan

[21] Appl. No.: 23,262

[22] Filed: Mar. 9, 1987

[30] Foreign Application Priority Data

Mar. 14, 1986 [JP] Japan .................................. 61-54831
Mar. 19, 1986 [JP] Japan .................................. 61-59229

[51] Int. Cl.⁴ ..................... H04N 1/40; H04N 1/46; H04N 3/15; H04N 9/73
[52] U.S. Cl. ............................................ 358/282; 358/29; 358/75; 358/80; 358/213.31; 358/280; 358/294
[58] Field of Search ............. 358/280, 213.19, 213.31, 358/283, 51, 75, 80, 298, 29 C, 294, 282

[56] References Cited

U.S. PATENT DOCUMENTS

| | | | |
|---|---|---|---|
| 4,159,488 | 6/1979 | Tanaka et al. | 358/213.31 |
| 4,521,804 | 6/1985 | Bendell | 358/213.31 |
| 4,598,322 | 7/1986 | Atherton | 358/213.31 |
| 4,673,972 | 6/1987 | Yukomizo | 358/75 |

FOREIGN PATENT DOCUMENTS

| | | | |
|---|---|---|---|
| 60-41371 | 3/1985 | Japan | 358/213.31 |
| 60-123158 | 7/1985 | Japan | 358/75 |
| 60-158769 | 8/1985 | Japan . | |
| 60-176360 | 9/1985 | Japan . | |

Primary Examiner—James J. Groody
Assistant Examiner—Randall S. Svihla
Attorney, Agent, or Firm—Antonelli, Terry & Wands

[57] ABSTRACT

A one-dimensional image sensor comprising a solid image pick-up element takes images in sequence, and generates an image signal. Clock pulses from a frequency variable type clock pulse generator having a frequency which varies in correspondence to a control signal are supplied to a one-dimensional image sensor, thereby image signals are outputted in sequence. The image signal is amplified by an amplifier and inputted to a comparator and compared with a reference signal. A frequency variable range of the frequency variable type clock pulse generator is set higher than the cut-off frequency of the amplifier, and the binary level output by the comparator is substantially the same as the image inputted to the one-dimensional image sensor and control is effected by the variable frequency of the clock pulses.

20 Claims, 8 Drawing Sheets

FIG. 10
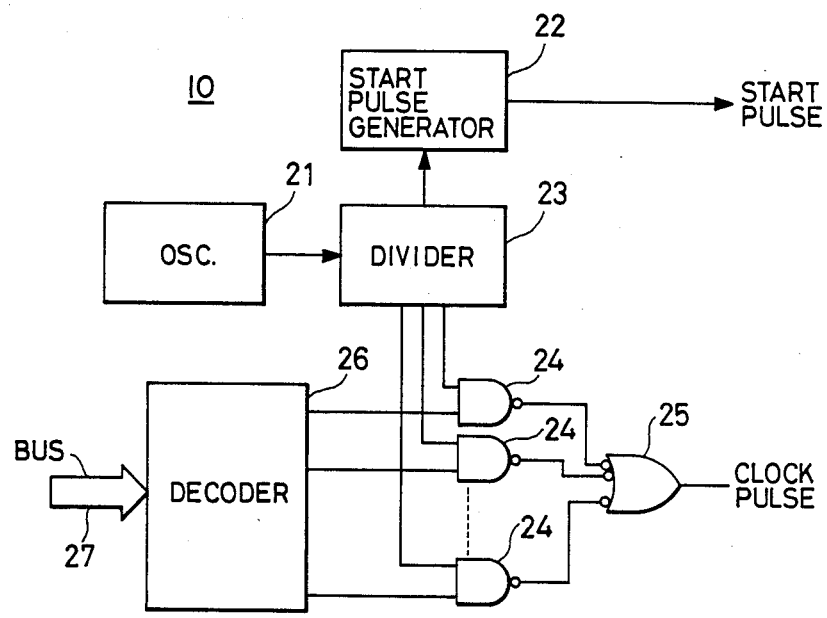
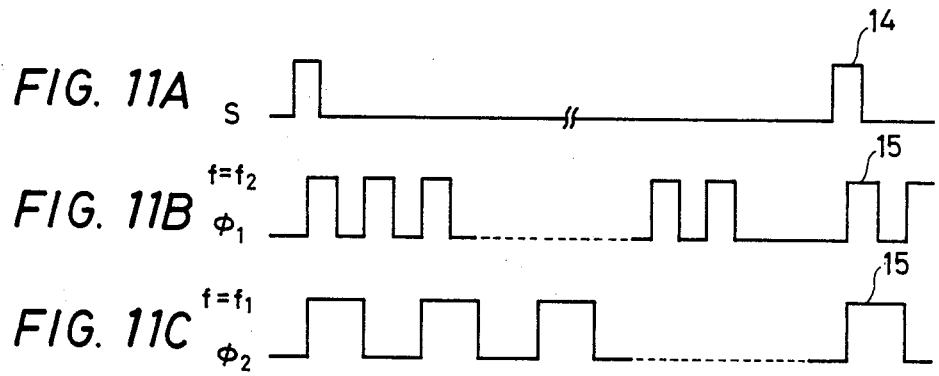
FIG. 11A  S
FIG. 11B  $\phi_1$  $f=f_2$
FIG. 11C  $\phi_2$  $f=f_1$ FIG. 12
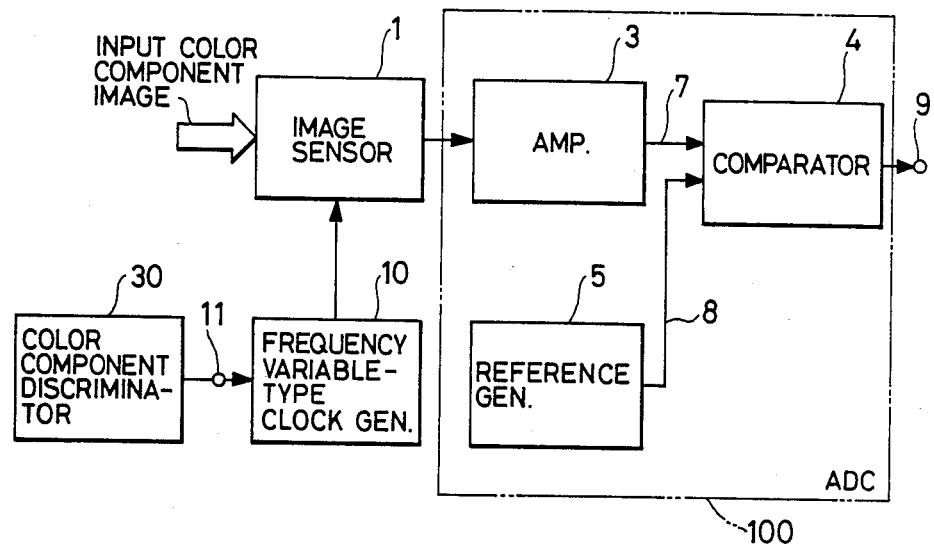
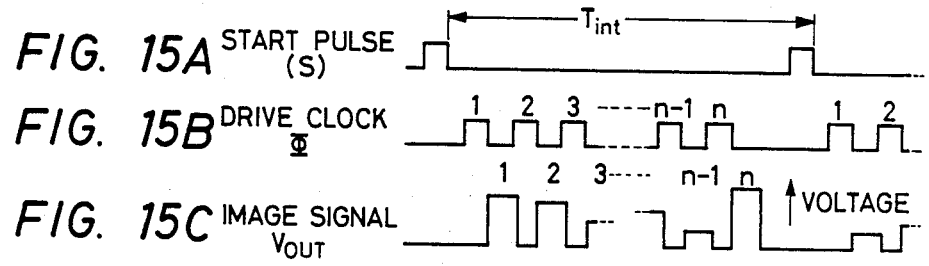
FIG. 15A START PULSE (S)
FIG. 15B DRIVE CLOCK Φ
FIG. 15C IMAGE SIGNAL V_OUT

IMAGE SIGNAL BINARY CIRCUIT WITH A VARIABLE-FREQUENCY CLOCK SIGNAL GENERATOR FOR DRIVING AN IMAGE SENSOR

BACKGROUND OF THE INVENTION

The present invention relates to a binary circuit where image signal outputted from an image sensor is converted into a binary signal.

In the prior art, binary circuits to obtain an image signal using an image sensor and to convert the image signal into a binary signal have been used in may fields. FIG. 1 is a block diagram illustrating a binary circuit in the prior art. In FIG. 1, numeral 1 designates an image pick-up element for converting optical information into electric signals, e.g., a one-dimensional image sensor, and numeral 2 designates a circuit for generating drive clocks of fixed frequency to read the light receiving signal in sequence from the image sensor 1. The image sensor 1 outputs image signals in synchronization with clocks from the drive clock generator 2. Numeral 3 designates an amplifier for amplifying the image signals, and numeral 5 designates a reference voltage generator for generating reference voltage to discriminate level of white or black of the image signals. A variable resistor 6 adjusts and determines the reference voltage. A comparator 4 compares the reference voltage and the image signal, and generates a binary signal. The comparator 4 serves to emphasize the dark and pale state of the original picture by utilizing the binary signal. In a circuit of the prior art, for example, disclosed in Japanese patent application laid-open (Kokai) No. 60-158769, the reference voltage to convert the image signal of the dark and pale state into binary signal is adjusted using the variable resistor 6.

In such constitution of the prior art, the semi-fixed resistor 6 for adjusting the reference voltage must be arranged at position to make the adjustment easy and a method to facilitate the adjustment must be considered, resulting in the limitation that the circuit can not be made into a compact and simple structure.

Also in a color image signal binary circuit where optical information being indicent to an image sensor is color image, there exists a similar problem and adjustment of the reference voltage corresponding to color component image signals of plural colors is further complicated.

SUMMARY OF THE INVENTION

An object of the invention is to provide an image signal binary circuit wherein constitution is compact and the adjustment is simplified.

Another object of the invention is to provide a color image signal binary circuit which is simplified.

A further object of the invention is to provide a binary circuit wherein adjustment of binary reference level at binary coding of monochromatic image signal or color image signal is made easy.

In order to attain the above objects, the invention is provided with a frequency variable type drive clock generator where the frequency of pulse wave generated in response to a color signal is variable, and a clock signal generated by the drive clock generator is supplied to an image sensor.

The frequency variable type clock generator varies the frequency of the clock signal in response to the control signal. If the variable range of the clock signal is set in a range including a frequency higher than the cut-off frequency of a circuit installed between the image sensor and the comparator, the circuit between the image sensor and the comparator varies gain corresponding to the control signal, thereby the level of the input signal of the comparator is varied corresponding to the control signal. Consequently, the binary level of the comparator is varied corresponding to the control signal.

Or, the variable range of the clock signal may be set to a frequency lower than the cut-off frequency of a circuit installed between the image sensor and the comparator, and the reference voltage may be varied corresponding to the frequency of the drive clock, thereby the binary level in the comparator can be varied.

Further the invention, in order to attain the above objects, is provided with a constitution where the frequency of the clock pulse from the drive clock generator is automatically adjusted corresponding to the color components being incident to the image sensor so as to deal with the fact that the spectral sensitivity characteristics of the image sensor are different depending on the color components of the incident light in the color image signal binary circuit having the comparator. That is, the drive clock generator is installed so that the frequency of the drive clock supplied to the image sensor is varied corresponding to the color components being incident to the image sensor, thereby a color image binary circuit that does not require adjustment is a compact and simple structure is obtained.

BRIEF DESCRIPTION Of THE DRAWINGS

FIG. 10 is a circuit constitution diagram illustrating an example of a frequency variable type drive clock generator in FIG. 2 and FIG. 7;

FIGS. 11A, 11B, 11C are waveform charts illustrating output waveforms in the drive clock generator in FIG. 10;

FIG. 12 is a circuit constitution diagram illustrating the invention applied to a color image signal binary circuit;

FIGS. 15A, 15B, 15C are waveform charts illustrating signal waveforms in respective parts of the image sensor 1 in the embodiment of FIG. 12;

DETAILED DESCRIPTION OF THE PREFERRED EMBODIMENTS

Figure 1:
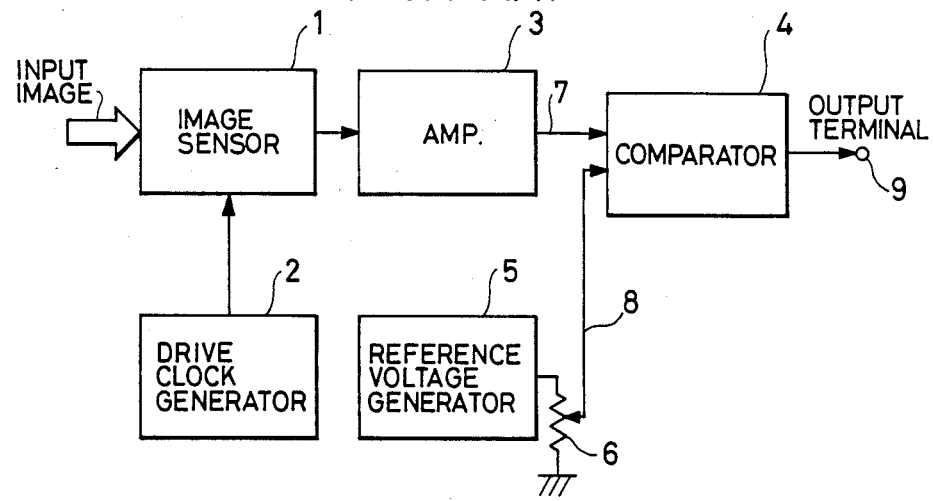
FIG. 1 is a block diagram illustrating circuit constitution of an image signal binary circuit in the prior art.
Figure 2:
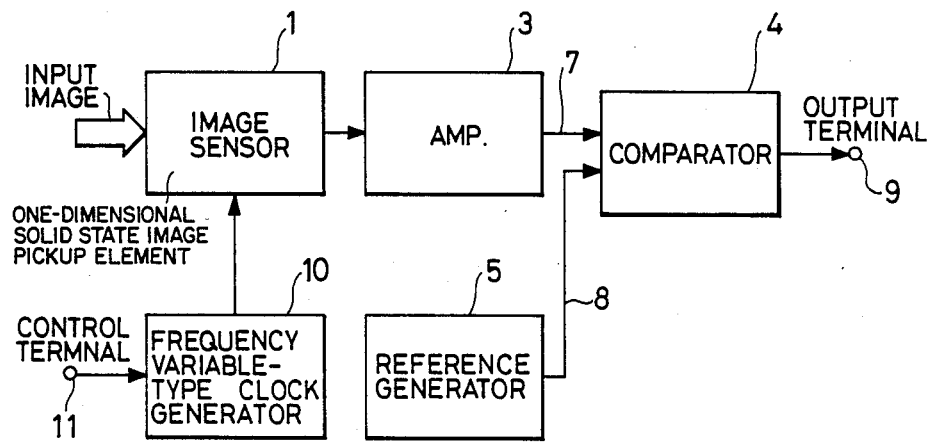
FIG. 2 is a block constitution diagram illustrating an image signal binary circuit as an embodiment of the invention.

Embodiments of the invention will now be described in detail referring to the accompanying drawings. FIG. 2 is a block diagram illustrating a first embodiment of the invention. An image signal read circuit of the first embodiment comprises an image sensor 1, an amplifier 3 for amplifying output signals of the image sensor 1 which may be at least a one-dimensional solid image pick-up element, a comparator 4, a reference voltage generator 5, and a frequency variable type drive clock generator 10. The image sensor 1, the amplifier 3, the comparator 4, and the reference voltage generator 5 are similar to those in FIG. 1.

The output voltage of the reference voltage generator 5 is applied directly to the comparator 4. The drive clock generator 10 varies frequency of the output clock signal in response to frequency control signal applied to a control terminal 11. The drive clock generator 10 will be described below. Optical information being incident to the image sensor 1 in response to clock signal from the drive clock generator 10 is outputted as pulse signal by the image sensor 1 and then supplied to the amplifier 3. The frequency of the signal outputted from the image sensor 1 varies depending on a frequency control signal applied to the control terminal 11.

Since the amplifier 3 has gain characteristics depending on the frequency of the input signals, even if signals of the same amplitude level are inputted, the signal level of the output signals varies depending on the frequency. Accordingly, even if the output voltage of the reference voltage generator 5 is constant, and since the level of the image signals 7 inputted to the comparator 4 varies in response to the frequency control signals inputted to the control terminal 11, the binary level in the comparator 4 also varies similar to the case where the reference voltage is varied.

Figure 3:
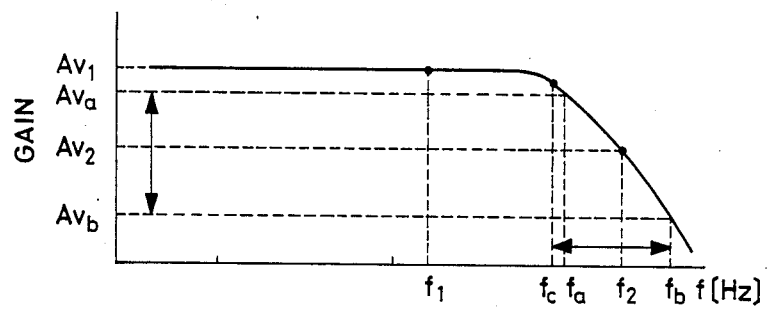
FIG. 3 is a graph illustrating frequency-gain characteristics of an amplifier 3 in the embodiment of FIG. 2.

FIG. 3 is a graph of the frequency-gain characteristics of the amplifier 3. The gain of the amplifier 33 gradually decreases when the frequency of the input signal exceeds the cut-off frquency $f_c$. Although the gain is $A_{v1}$ at the frequency $f_1$ lower than the cut-off frequency $f_c$, it decreases to $A_{v2}$ at the frequency $f_2$ higher than the cut-off frequency $f_c$.

In the invention, the region where the gain varies at prescribed rate corresponding to the frequency of the input signals (the region from the frequdncy $f_a$ to the frequency $f_b$) it utilized. The frequency control signal applied to the control terminal 11 of the drive clock generator 10 is varied, thereby the frequency of the image signal outputted from the image sensor 1 is varied in the region from $f_a$ to $f_b$. Then the gain of the amplifier 3 varies in the region from $A_{va}$ to $A_{vb}$, thereby the voltage level of the output of the amplifier 3 varies. When the output voltage level of the amplifier 3 varies, the binary level of the comparator 4 varies even if the reference voltage generated by the reference voltage generator 5 is constant.

FIGS. 5A, 5B, and FIGS. 6A, 6B show the relation of the output voltage of the amplifier 3 to the reference voltage and the relation of the output signal of the comparator 4 when the frequency of the input signals of the amplifier 3 are $f_1$, $f_2$ respectively. In the figures, numeral 7 designates output signal of the amplifier 3, numeral 8 designates output signal of the reference voltage generator 5, and numeral 9 designates output signal of the comparator 4.

When the frequency of the input signal of the amplifier 3 is $f_1$, since the gain of the amplifier 3 is as high as $A_{v1}$, pulses to the fourth pulse exceed the reference voltage $V_{TH}$. However, when the frequency increases to $f_2$, the gain of the amplifier 3 decreases to $A_{v2}$ and therefore the number of pulses exceeding the reference voltage decreases to two pulses. Consequently, although the binary signal of (001111) is outputted from the comparator 4 at the frequency $f_1$, the output of (000011) is obtained at the frequency $f_2$. This corresponds to the case that the reference voltage is made $V_{TH2}$ as shown by broken line in FIG. 5A.

Assuming that the level 1 in the output of the comparator 4 represents "black" and the level 0 represents "white", when the frequency is $f_1$, a level being nearer to "white" in the original signal is outputted as a "black" signal in comparison to the case of the frequency $f_2$. On the contrary, when the frequency is $f_2$, a level being nearer to "black" is outputted as "white". Accordingly, in order to read the original picture with little density difference, such as the original document written in a pale color, the frequency control signal applied to the control terminal 11 is controlled and the frequency of the read clock of the image sensor 1 may be lowered.

Figure 4:
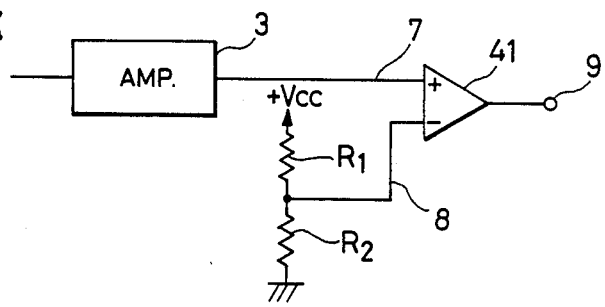
FIG. 4 is a circuit diagram ilustrating a concrete circuit example of a reference voltage generator in the embodiment of FIG. 2.
Figure 5A:
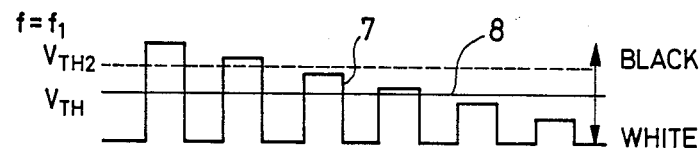
FIGS. 5A, 5B, 6A, 6B are waveform charts illustrating relation of image signal, reference voltage and comparator output in a comparator 4 in the embodiment of FIG. 2.
Figure 5B:
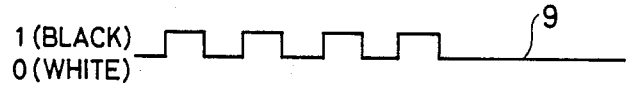
Figure 6A:
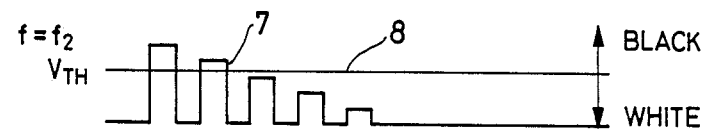
Figure 6B:
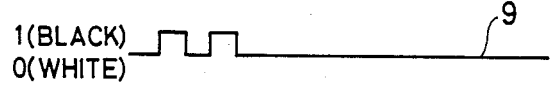

FIG. 4 shows a circuit of the reference voltage generator 5 and the comparator 4. Since the reference voltage $V_{TH}$ may be fixed in the invention, the dividing voltage of the power source $V_{cc}$ by resistors $R_1$, $R_2$ is made the reference voltage $V_{TH}$. The comparator 4 comprises a comparator 41, and the reference voltage divided by the resistors $R_1$, $R_2$ is supplied to the reference voltage input end of the comparator 41.

According to the embodiment as above described, even if the reference voltage 8 ($V_{TH}$) is made constant, the generated clock frequency f of the drive clock generator 11 to be inputted to the image sensor 1 is varied, thereby the relative level of the reference voltage $V_{TH}$ at the binary coding of the image signal 7 of the original document of intermediate color can be varied.

The frequency range ($f_a$–$f_b$) used in the embodiment can be freely set by varying the cut-off frequency $f_c$ by design of the amplifier 3. Accordingly, the frequency range can be set corresponding to the reaction speed of the image sensor 1 and the processing speed of appliances connected to the output terminal 9.

A second embodiment of the invention will be described in detail referring to the accompanying drawings. Although the clock signals having a frequency higher than the cut-off frequency $f_c$ of the amplifier 3 are generated in the first embodiment, the frequency band lower than the cut-off frequency $f_c$ is used in the second embodiment. Consequently, the voltage level of the image signal inputted to the comparator 4 is constant irrespective of the frequency of the drive clock. In the second embodiment, the reference voltage supplied to the comparator 4 is varied corresponding to frequency of the drive clock, thereby the binary level in the comparator 4 is varied.

Figure 7:
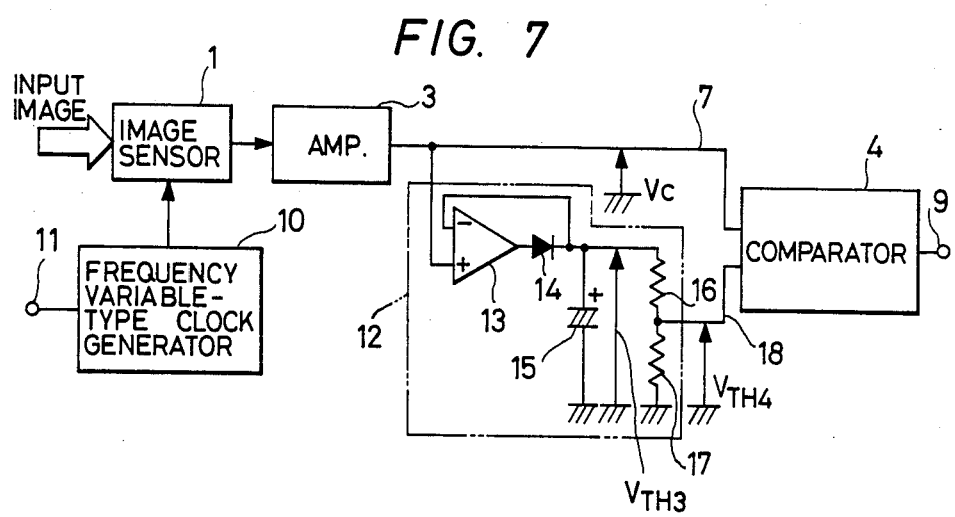
FIG. 7 is a circuit constitution diagram of an image signal binary circuit as another embodiment of the invention.

FIG. 7 is a block diagram illustrating the second embodiment. FIG. 7 is different from FIG. 2 in that a reference voltage generator designated by numeral 12 generates reference signal 18 based on the output voltage of the amplifier 3. The image sensor 1, the amplifier 3, the comparator 4, and the frequency variable type drive clock generator 10 are similar to those in the first embodiment. However, the cut-off frequency $f_c$ of the amplifier 3 is set higher than the upper limit of the frequency variation range of the drive clock generated by the frequency variable type drive clock generator 10 as hereinafter described.

The reference voltage generator 12 of the embodiment is constituted by a peak hold circuit comprising a comparator 13, a diode 14, a capacitor 15, and a voltage divider comprising resistors 16, 17. The peak hold circuit holds the peak value of the output voltage of the amplifier 3 in the capacitor 15. The voltage $V_{TH3}$ held in the capacitor 15 is divided by the resistors 16, 17, and the divided voltage is supplied as the reference voltage $V_{TH4}$ to the comparator 4. The holding period of the peak value, i.e., response characteristics of the peak hold circuit can be determined corresponding to the time constant determined by impedance of the capacitor 15 and circuits (such as the resistors 16, 17) connected thereto. In the embodiment, the time constant is set to a sufficiently large value.

Figure 8:
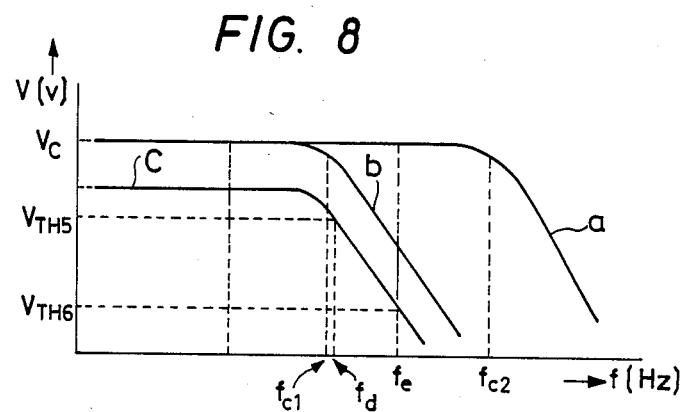
FIG. 8 is a graph illustrating output-frequency characteristics of an amplifier 3 and a reference voltage generator 5 in the embodiment of FIG. 7.

FIG. 8 shows frequency characteristics of the output voltage 7 of the amplifier 3 and the output voltage 18 of the reference voltage generator 12 in the embodiment. Graph a illustrates the frequency characteristics of the output signal of the amplifier 3, graph b illustrates the frequency characteristics of the output signal of the peak hold circuit, and graph c illustrates the frequency characteristics of the reference signal inputted to the comparator 4. As shown in graph b, the cut-off frequency $f_{c1}$ of the peak hold circuit is set lower than the cut-off frequency $f_{c2}$ of the amplifier 3. The cut-off frequency $f_{c1}$ of the peak hold circuit can be set by varying the output impedance of the comparator 13, the internal resistance of the diode 14, the capacitance value of the capacitor 15, and the resistance values of the dividing resistors 16, 17.

In the second embodiment, the frequency of the clock pulse is varied in the range from $f_d$ to $f_e$, thereby the reference voltage $V_{TH4}$ is varied in the range from $V_{TH5}$ to $V_{TH6}$ so as to vary the binary level in the comparator 4.

That is, even if signals having the same black peak level are inputted to the peak hold circuit from the amplifier 3, and since the black peak level is varied in the range from $V_{TH5}$ to $V_{TH6}$ by varying the frequency of the drive clocks in the range from $f_d$ to $f_e$, the binary level in the comparator 4 is varied corresponding to the frequency of the drive clocks even at the image signals having the same black peak level.

Figure 9A:
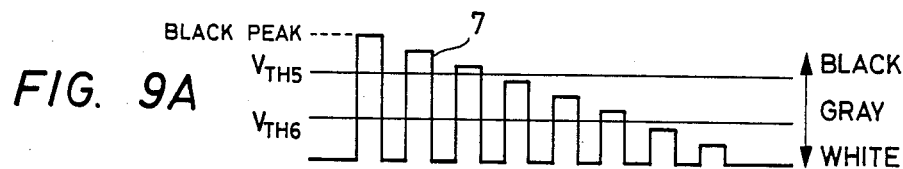
FIGS. 9A, 9B, 9C are waveform charts illustrating relation of image signal, reference voltage and comparator output on a comparator 4 in the embodiment of FIG. 7.
Figure 9B:
Figure 9C:

FIGS. 9A, 9B, 9C show input/output signals of the comparator 4 when the reference voltage $V_{TH4}$ is varied from $V_{TH5}$ to $V_{TH6}$. When the image signal having voltage decreasing stepwise is inputted as shown in FIG. 9A, outputs of the comparator 4 in the case of the reference voltage being $V_{TH5}$ and $V_{TH6}$ become as shown in FIGS. 9B, 9C respectively. When the clock frequency is made $f_e$, the reference voltage 18 drops to $V_{TH6}$ even at the same black peak level and therefore more signals are outputted as black. Accordingly, when a original document with little density is read, the frequency of the drive clocks may be increased.

According to the invention as above described, the binary level of the comparator can be varied by varying the frequency of the drive clocks.

In the second embodiment, since the image signal (black peak value) at a portion being the nearest to black among the optical information read by the image sensor 1 is held by the peak hold circuit and the reference voltage is determined based on the held voltage, the optimum reference voltage can be automatically determined by the read image.

If the time constant determined by the capacitor 15 and the resistors 16, 17 is set relatively short in the embodiment, since the reference voltage is automatically varied at front and rear sides with respect to the black peak existing at the midway when a sheet of the image is read, the binary level in the comparator 4 is varied and the binary state of the image signals can be obtained at a uniform sensitivity even if portions being different in the density exist on one original document.

Also in the second embodiment, since the power source of the reference voltage generator is made to be an output voltage of the amplifier 3, the resistor 16 may be set small or the resistance value may be made zero, thereby the maximum value of the dynamic range of the output of the amplifier 3 coincides with the maximum value of the reference voltage thereby the excessively high voltage is not used as the reference voltage source. When the voltage is divided by the resistor 16, the image signal 7 also may be divided by the resistor.

Further in the second embodiment, although the plus terminal of the comparator 13 of the reference voltage generator 12 is connected to the output end of the amplifier 3, it may be connected to the output end of the frequency variable type drive clock generator 10 and the reference voltage may be generated directly from the drive clock signal. In this case, however, the voltage of the output clock signal of the drive clock generator 10 must be set larger than the maximum value of the output of the amplifier 3 or otherwise the output of the amplifier 3 must be level-downed by a resistance dividing network or the like and then supplied to the comparator 4.

Next, a constitution of the frequency variable type drive pulse generator 10 used in the first and second embodiments will be shown in FIG. 10. The frequency variable type drive pulse generator 10 comprises an oscillator 21, a start pulse generator 22, a frequency divider 23, an AND circuit 24, an OR circuit 25, and a decoder 26. The frequency divider 23 divides the frequency of the original clock pulses generated by the oscillator 21 and outputs the divided frequency. The frequency control signal is applied to the decoder 26 through a bus 27 (connected to the control terminal 11 in FIG. 2), and the decoder 26 decodes the frequency control signal into binary codes of $2^n$ and outputs the binary codes per each bit to the AND circuit 24. The output of the frequency divider 23 is supplied per each bit to another input end of the AND circuit 24. The output of the AND circuit 24 is inputted to the OR circuit 25, which outputs logic 1 if any one of the AND circuits 24 is logic 1. In this constitution, for example, when the decoder 26 outputs 2 in the binary notation, the output of the frequency divider 23 is frequency-divided in two. When the decoder 26 outputs 4 in the binary notation, the output is frequency-divided in four. The start pulse generator 22 generates signals indicating the read start of the image sensor 1.

In addition, the control signal which is supplied through the bus 27 and applied to the control signal 11 may be automatically calculated and transmitted when the operator inputs it by an input means (not shown) or when the output of the comparator 4 is processed by a processing unit (not shown).

FIGS. 11A, 11B, 11C show the relation of the start pulse (S) to the clock pulse from the OR circuit 25. FIG. 11A shows the start pulse (S), FIG. 11B shows the clock signal ($\phi_1$) of the frequency $f_2$, and FIG. 11C shows the clock pulse ($\phi_2$) of the frequency $f_1$. Of course, the start pulse (S) and the clock pulse ($\phi$) are not inputted to the image sensor 1.

The first and second embodiments do not particularly touch on a light being incident to the image sensor 1. However, in general, the color component signals of the three colors, i.e., red (R), green (G) and blue (B), are obtained from the color original document using the image sensor, and a color image input device is frequently used so as to obtain the image data per one color. In this case, in order to obtain the color component signals of plural colors, one method uses individual circuits for respective color component images so that the image signals from the image sensor corresponding to the plural colors are made the binary state and converted into the image data. Or, another method uses one image sensor and one image exclusive circuit so that the circuit constant is adjusted or varied in interlocking with a change of color component filters installed in front of the image sensor. Also in this case, problems similar to the prior art exist even at the binary circuit portion of the image exclusive circuit and therefore the invention becomes effective.

A third embodiment of the invention applied to a color image input unit will now be described in detail referring to the accompanying drawings.

Figure 13:
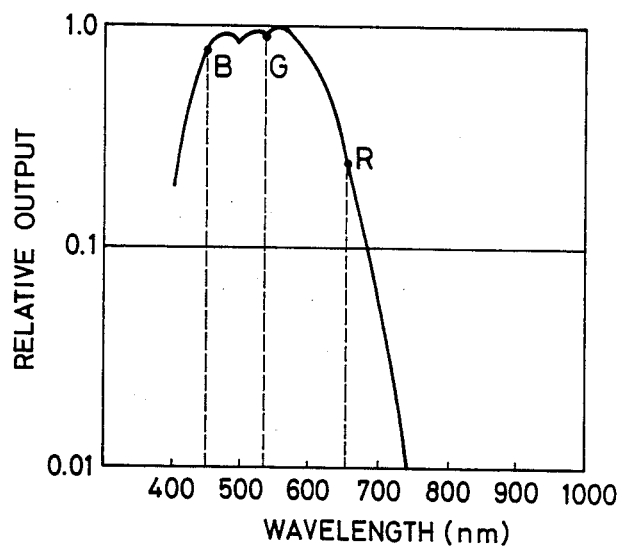
FIG. 13 is a diagram illustrating spectral sensitivity characteristics of an image sensor 1 in the embodiment of FIG. 12.
Figure 14:
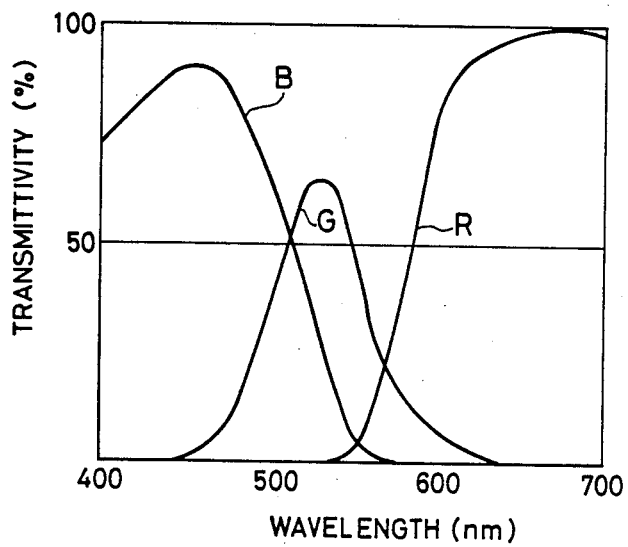
FIG. 14 is a diagram illustrating transmittivity characteristics of color component filters installed in front of an image sensor 1 in the embodiment of FIG. 12.

In FIG. 12, numerals 1–11 designates similar parts to the circuit elements in the embodiment of FIG. 2, and numeral 30 designates a color component discriminator. In the embodiment of FIG. 12, the amplifier 3, the comparator 4 and the reference voltage generator 5 are assembled together and called an analog/digital converter (ADC) 100. The image sensor 1 has the spectral sensitivity characteristics as shown in FIG. 13, and the relative output voltage of the output signal of the image sensor 1 becomes different depending on the wave length of the optical signals being incident to the image sensor 1. In order to obtain the color component images of the three colors, R, G, B, when the color component filters of the colors R, G, B are arranged alternately at the light receiving surface side of the image sensor 1, since the color component signals being incident to the image sensor 1 are different from each other in wave length as shown in a graph example of the transmittivity of each color component filter and wave length as shown in FIG. 14, the output signal voltage of the picture signals from the image sensor does not become equal but is different corresponding to the wave length of each of the color component signals R, G, B.

In the image sensor 1, the optical information being incident to the n image sensors is converted into the image signal voltage, and in synchronization with the start pulse (S) from the above-mentioned frequency variable type drive clock generator 10 as shown in FIG. 15A and the clock pulse ($\phi$) as shown in FIG. 15B the image signal $V_{out}$ in analog pulse form is outputted in sequence as shown in FIG. 15C. Even if the frequency of the drive clock $\phi$ is varied, the amount of the output voltage of the image signal $V_{out}$ is not affected in the CCD type image sensor. Also in the MOS type image sensor, the frequency of the start pulse (S) to control the charge storage time ($T_{int}$) shown in FIG. 15A is held constant, thereby the output voltage of the image signal $V_{out}$ is not affected by the frequency variation of the drive clock ($\phi$) similar to the CCD type image sensor. The frequency variable type drive clock generator 10 varies the frequency of the output drive clock signal corresponding to the frequency control signal applied from the color component discriminator 30 to the control terminal 11. The frequency-gain characteristics of the amplifier 3 are as shown in FIG. 3, and the circuit operation of the rear stage of the amplifier 3 is similar to that described in detail in the foregoing embodiments.

Figure 16:
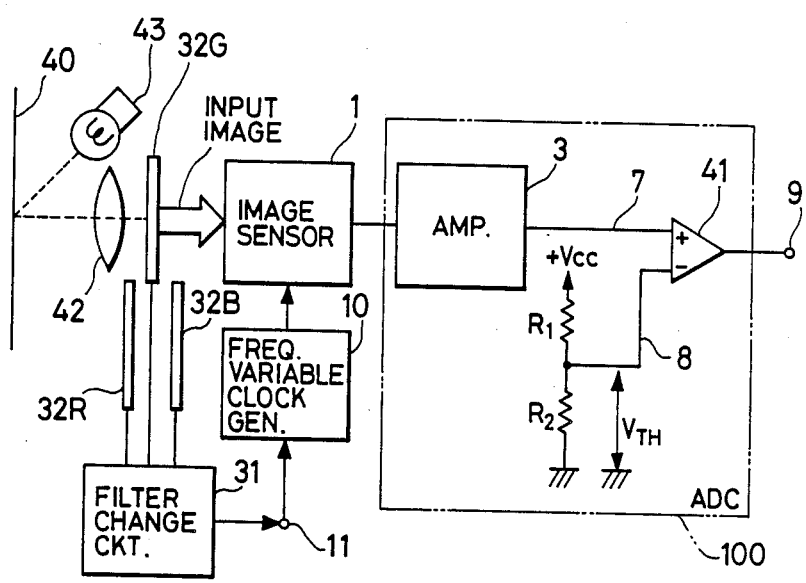
FIG. 16 is a circuit constituting diagram of an embodiment of the invention applied to a color image signal binary circuit.

FIG. 16 is a diagram illustrating a constitution of the color component discriminator in the embodiment of FIG. 12. Numeral 40 designates a color original document, numeral 43 designates a light source, and numeral 42 designates a lens. A filter change circuit 31 changes color component filters 32R, 32G, 32B, and outputs the color component discrimination signal to the control terminal 11. The ADC 100 has similar constitution to the circuit shown in FIG. 4. The filter change circuit 31 discriminates the color component filters 32R, 32G, 32B arranged in front of the light receiving surface of the image sensor 1, and outputs control signals corresponding to the respective color components to the terminal 11. As seen in the graph of FIG. 13, since color R is low in the spectral sensitivity of the image sensor 1 in comparison to other colors G, B, in the case of the color component filter 32R, a control signal to lower the frequency of the drive clock in comparison to other filters 32G, 32B is outputted to the control terminal 11.

According to the thrid embodiment as above described, even if the reference voltage 8 ($V_{TH}$) is made constant, the generated clock frequency f of the frequency variable type drive clock generator 10 to be inputted to the image sensor 1 is varied, thereby deviation of the image signal voltage of each color component due to the spectral sensitivity characteristics of the image sensor 1 can be made uniform and the relative level of the reference voltage 8 for binary coding the image signal 7 of each color component can be also made uniform.

Figure 17:
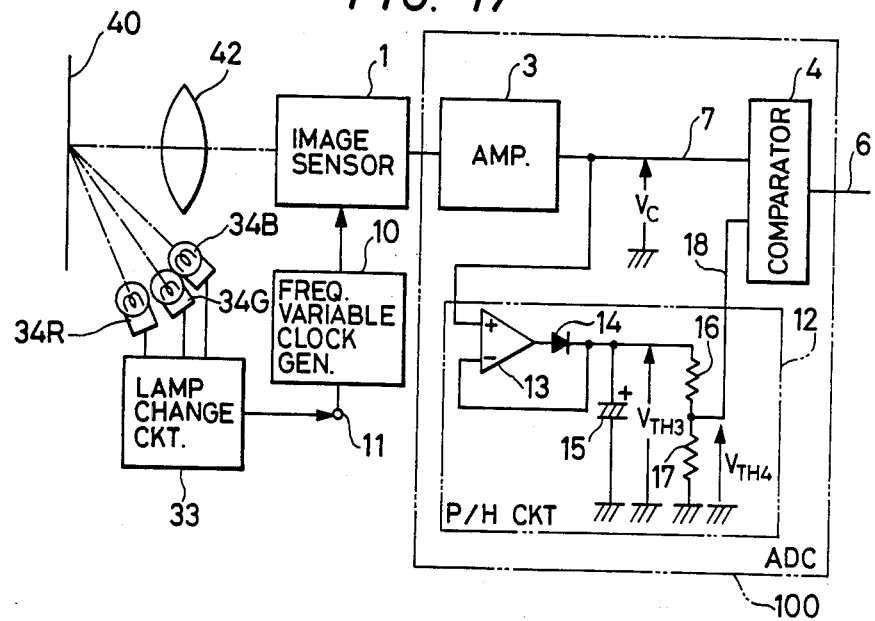
FIG. 17 is a circuit constitution diagram of another embodiment of the invention applied to a color image signal binary circuit.

In order to apply the invention to a color image input device, the constitution of the foregoing second embodiment may be used. FIG. 17 shows an embodiment in this case. The ADC 100 has similar constitution to that shown in FIG. 7. Numerals 34R, 34G, 34B designate lamps to emit respective color components, and the lamp change circuit 33 selects and changes one of the lamps 34R, 34G, 34B and applies the discrimination signal of the emitting lamp to the control terminal 11. The cut-off frequency $f_c$ of the amplifier 3 is set higher than the upper limit of the frequency variation range of the drive clocks as already described in detail. Operation of the circuit at rear stage of the amplifier 3 is similar to that in the foregoing embodiment.

According to the embodiment, the frequency of the drive clock is varied corresponding to the color component image being incident to the image sensor 1, thereby deviation of the output signal of each color component image due to the spectral characteristics of the image sensor 1 can be absorbed by varying the binary level of the comparator and deviation of the binary data of each color component image signal can be eliminated.

Figure 18:
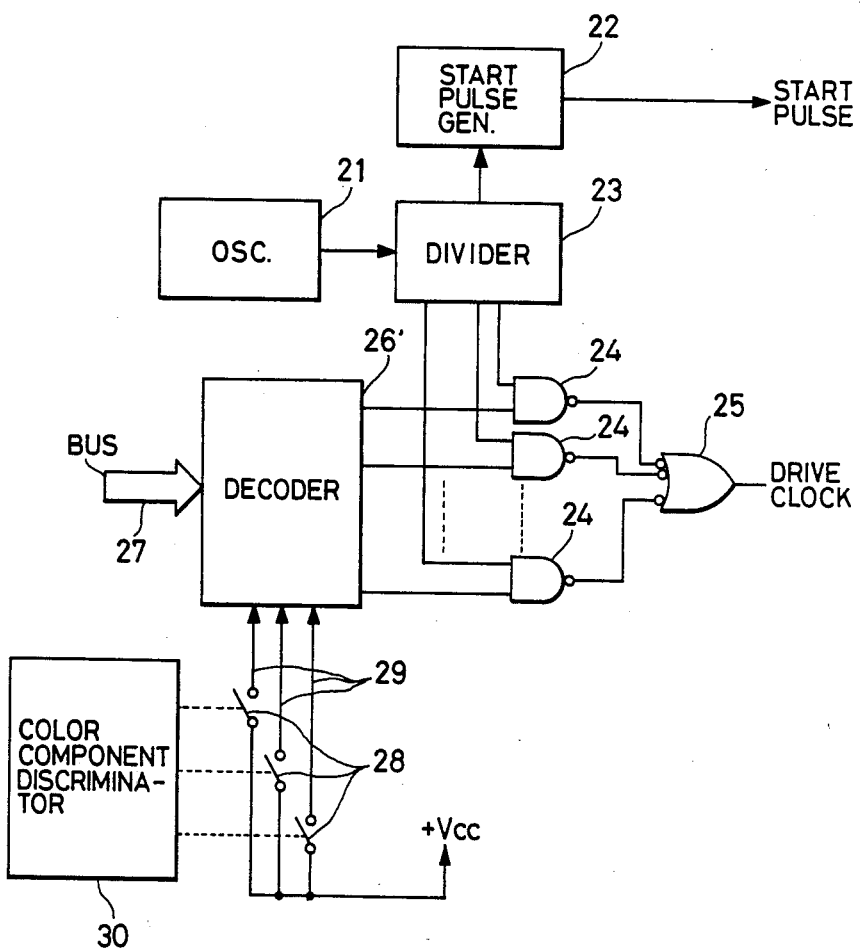
FIG. 18 is a block diagram illustrating a concrete circuit constitution of a frequency variable type drive clock generator 10 in circuit constitution of FIGS. 12, 16 and 17.

FIG. 18 shows a circuit example of the drive clock generator 10 in the embodiments shown in FIG. 12, FIG. 16 and FIG. 17. The basic circuit constitution is similar to that shown in FIG. 10. In a decoder 26', a bus 27 and signal lines 29 are connected to the control terminal 11. Numeral 28 designates a switch group which is ON/OFF controlled in response to the discrimination signal from a color component discriminator 30, and the switch 28 corresponding to the color element inputted to the image sensor 1 is turned on and $+V_{cc}$ appears at the signal line 29 connected to the selected switch 28. The decoder 26' outputs the binary code group of $2^n$ to the output terminal in response to the control signal from the bus 27 and the signal from the signal line 29. Since the circuit constitution of the decoder 26' is obvious to those skilled in the art, its description shall be omitted together with a detailed circuit constitution of the decoder 26.

According to the invention as above described in detail, in place of the clock with the frequency f constant supplied to the image sensor in the prior art, the drive clock generator with the frequency f variable by hardware or software is installed, thereby the variable resistor for adjusting the output reference voltage $V_{TH}$ of the reference voltage generator may be omitted and the circuit with non-adjustment and a compact and simple structure can be realized.

The clock frequency f is varied and set by hardware or software, thereby the relative level difference between the image signal inputted to the comparator and the reference voltage ($V_{TH}$) can be easily adjusted and the binary output data also can be easily adjusted. The drive clock generator is installed so that the frequency of the drive clock supplied to the image sensor is interlocking with the color component signal being incident to the image sensor is made variable, thereby duplicate binary circuits of exclusive use for respective color components may be omitted and one binary circuit can process respective color components. Moreover, a binary circuit witn not needing adjustment and having a compact and simple structure can be realized.

In the simultaneous image read apparatus of plural color components, a single binary circuit with the same circuit constant can be used by a number of plural color components without the need for adjustment and the binary circuits with dedicated circuit constant of exclusive use for respective color components are not required.

In the apparatus where the image is read by one circuit at times of the plural color components, the binary circuit of the same circuit constant can be used for the plural color components, and a binary circuit with nonadjustment and having a compact and simple structure can be realized.

What is claimed is:
1. An image signal binary circuit, comprising:
clock signal generating means for varying the frequency of a generated clock signal in response to a control signal;
an image sensor for converting an object into an electric image signal and for outputting said image signal in synchronization with said clock signal; and
comparing means for comparing said image signal from said image sensor with a reference signal and for outputting a binary image signal;
wherein the signal level of one of said image signal from said image sensor and said reference signal is varied in accordance with the frequency of said generated clock signal.

2. An image signal binary circuit according to calim 1, wherein
an image of a specific color component is inputted to said image sensor, and said control signal varies according to said specific color component.

3. An image signal binary circuit, comprising:
clock signal generating means for varying the frequency of a generated clock signal in response to a control signal;
an image sensor for converting an object into an electric image signal and for outputting said image signal in synchronization with said clock signal;
comparing means for comparing said image signal from said image sensor with a reference signal and for outputting a binary image signal; and
amplifying means connected between said image sensor and said comparing means for amplifying said image signal;
wherein the frequency variation range of said clock signal generating means is set to a region exceeding the cut-off frequency of said amplifying means.

4. An image signal binary circuit, comprising:
clock signal generating means for varying the frequency of a generated clock signal in response to a control signal;
an image sensor for converting an object into an electric image signal and for outputting said image signal in synchronization with said clock signal;
comparing means for comparing said image signal from said image sensor with a reference signal and for outputting a binary image signal; and
amplifying means connected between said image sensor and said comparing means for amplifying said image signal;
wherein the cut-off frequency of said amplifying means is set to a frequency lower than the maximum frequency in the frequency variation range of said clock signal generating means.

5. An image signal binary circuit, comprising:
clock signal generating means for varying the frequency of a generated clock signal in response to a control signal;
an image sensor for converting an object into an electric image signal and for outputting said image signal in synchronization with said clock signal;
comparing means for comparing said image signal from said image sensor with a reference signal and for outputting a binary image signal;
amplifying means for amplifying said image signal from said image sensor and for supplying the amplified image signal to said comparing means; and
reference signal generating means for generating said reference signal and for supplying it to said comparing means;
wherein said reference signal generating means comprises peak hold means for detecting and holding the peak value of the amplified image signal, and dividing means for dividing an output of said peak hold means to generate said reference signal; and
wherein the cut-off frequency of said peak hold means is set to a frequency lower than the maximum frequency in the frequency variation range of said clock signal generating means.

6. An image signal binary device, comprising:
   frequency variable type clock signal generating means for generating a clock signal of a prescribed frequency in response to a control signal;
   means for converting an object into an image signal and for outputting said image signal in synchronization with said clock signal;
   means for generating a reference signal; and
   comparing means for comparing the image signal with said reference signal and for outputting a binary image signal;
   wherein the signal level of one of said image and reference signals inputted to said comparing means is varied in accordance with the frequency of said clock signal.

7. An image signal binary device according to claim 6, wherein a specific color component of the object is inputted to a light receiving member of said converting means.

8. An image signal binary device, comprising:
   frequency variable type clock signal generating means for generating a clock signal of a prescribed frequency in response to a control signal;
   means for converting an object into an image signal and for outputting said image signal in synchronization with said clock signal;
   means for generating a reference signal;
   comparing means for comparing said image signal with said reference signal and for outputting a binary image signal; and
   amplifying means for amplifying said image signal from said converting means and for supplying the amplified image signal to said comparing means;
   wherein the frequency variation range of said frequency variable type clock signal generating means is set higher than the cut-off frequency of said amplifying means.

9. An image signal binary device, comprising:
   frequency variable type clock signal generating means for generating a clock signal of a prescribed frequency in response to a control signal;
   means for converting an object into an image signal and for outputting said image signal in synchronization with said clock signal;
   means for generating a reference signal;
   comparing means for comparing said image signal with said reference signal and for outputting a binary image signal; and
   amplifying means for amplifying said image signal from said converting means for supplying the amplified image signal to said comparing means;
   wherein said reference signal generating means comprises peak hold means for receiving said amplified image signal and for detecting and holding the peak value thereof; and
   wherein the frequency variation range of said frequency variable type clock signal generating means is set lower than the cut-off frequency of said amplifying means and higher than the cut-off frequency of said peak hold means.

10. An image signal binary device, comprising:
    frequency variable type clock signal generating means for generating a clock signal of a prescribed frequency in response to a control signal;
    means for converting an object into an image signal and for outputting said image signal in synchronization with said clock signal;
    means for generating a reference signal;
    comparing means for comparing said image signal with said reference signal and for outputting a binary image signal;
    color separating means installed on a light receiving member of said converting means for separating a selected one of a plurality of color components from the object and for introducing the selected color component to said light receiving member; and
    means for generating said control signal according to the selected color component.

11. An image signal binary device, according to claim 10, further comprising:
    amplifying means for amplifying said image signal from said converting means and for supplying the amplified image signal to said comparing means;
    wherein the frequency variation range of said frequency variable type clock signal generating means is set higher than the cut-off frequency of said amplifying means.

12. An image signal binary device according to claim 11,
    wherein said reference signal generating means comprises peak hold means for receiving said amplified image signal and for detecting and holding the peak value thereof; and
    wherein the frequency variation range of said frequency variable type clock signal generating means is set lower than the cut-off frequency of said amplifying means and higher than the cut-off frequency of said peak hold means.

13. An image signal binary device according to claim 11, wherein said reference signal generating means further comprises dividing means connected to said peak hold means for dividing an output of said peak hold means to generate said reference signal.

14. An image signal binary device, comprising:
    frequency variable type clock signal generating means for generating a clock signal of a prescribed frequency in response to a control signal;
    means for converting an object into an image signal and for outputting said image signal in synchronization with said clock signal;
    means for generating a reference signal;
    comparing means for comparing said image signal with said reference signal and for outputting a binary image signal; and
    amplifying means for amplifying said image signal from said converting means and for supplying the amplified image signal to said comparing means;
    wherein a specific color component of the object is inputted to a light receiving member of said converting means; and
    wherein the frequency variation range of said frequency variable type clock signal generating means is set higher than the cut-off frequency of said amplifying means.

15. An image signal input device, comprising:
    an image sensor;
    clock signal generating means for generating a clock signal to drive said image sensor, said clock signal generating means having a control terminal, the frequency of said clock signal being varied in accordance with a control signal inputted to said control terminal;
amplifying means for amplifying an image signal outputted from said image sensor;
a reference signal generating circuit for generating a reference signal; and
comparing means for comparing the amplified image signal with said reference signal;
wherein a signal amplitude of one of said image and reference signals applied to said comparing means is varied in accordance with the frequency of said clock signal.

16. An image signal input device according to claim 15, wherein said image sensor comprises at least a one-dimensional solid-state image pick-up element.

17. An image signal input device, comprising:
an image sensor for generating an image signal;
clock signal generating means for generating a clock signal to drive said image sensor, said clock signal generating means having a control terminal, the frequency of said clock signal being varied in accordance with a control signal inputted to said control terminal;
amplifying means for amplifying said image signal generated by said image sensor;
a reference signal generating circuit for generating a reference signal; and
comparing means for comparing the amplified image signal with said reference signal;
wherein said image sensor comprises at least a one-dimensional solid-state image pick-up element; and
wherein said clock signal generating means comprises oscillating means, frequency dividing means for dividing an output of said oscillating means, decoder means for decoding said control signal, and a logic circuit for receiving an output of said frequency dividing means and an output of said decoder means and for generating said clock signal.

18. An image signal input device, comprising:
an image sensor for generating an image signal;
clock signal generating means for generating a clock signal to drive said image sensor, said clock signal generating means having a control terminal, the frequency of said clock signal being varied in accordance with a control signal inputted to said control terminal;
amplifying means for amplifying said image signal generated by said image sensor;
a reference signal generating circuit for generating a reference signal; and
comparing means for comparing the amplified image signal with said reference signal;
wherein said image sensor comprises at least a one-dimensional solid-state image pick-up element; and
wherein the frequency variation range of said clock signal is set to a frequency range such that the gain of said amplifying means varies at a prescribed rate in accordance with the frequency of said clock signal.

19. An image signal input device, comprising:
an image sensor for generating an image signal;
clock signal generating means for generating a clock signal to drive said image sensor, said clock signal generating means having a control terminal, the frequency of said clock signal being varied in accordance with a control signal inputted to said control terminal;
amplifying means for amplifying said image signal generated by said image sensor;
a reference signal generating circuit for generating a reference signal; and
comparing means for comparing the amplified image signal with said reference signal;
wherein said image sensor comprises at least a one-dimensional solid-state image pick-up element; and
wherein the frequency variation range of said clock signal is set to a frequency range such that the gain of said amplifying means is constant.

20. An image signal input device according to claim 19, wherein said reference signal generating circuit comprises a circuit for peak-holding the amplified image signal, and wherein the frequency variation range of said clock signal is set to a frequency range such that a frequency characteristic of said peak-holding circuit varies at a prescribed rate in accordance with the frequency of said clock signal.

* * * * *